United States Patent [19]
Huang

[11] Patent Number: 5,488,848
[45] Date of Patent: Feb. 6, 1996

[54] KEYRING HOLDER

[76] Inventor: Yu-Hwei Huang, No. 7, Alley 2, Lane 85, Min Tsu Rd., Lu Chou Hsiang, Taipei Hsien, Taiwan

[21] Appl. No.: 274,068

[22] Filed: Jul. 12, 1994

[51] Int. Cl.⁶ ............................................. A44B 15/00
[52] U.S. Cl. ........................ 70/456 R; 24/600.2; 63/23; 70/459
[58] Field of Search ................... 70/456 R, 457, 70/459, 460; 24/599.9, 600.2, 598.2, 573.5, 376; 40/323, 27.5; 63/18, 19, 23

[56] References Cited

U.S. PATENT DOCUMENTS

| | | | |
|---|---|---|---|
| 271,121 | 1/1883 | Riley et al. | 70/459 |
| 685,526 | 10/1901 | Perry | 63/23 |
| 1,469,089 | 9/1923 | Johnson | 24/573.5 X |
| 1,660,927 | 2/1928 | Larsen | 24/600.2 |
| 1,895,952 | 1/1933 | Wachenheimer | 24/573.5 |
| 2,527,491 | 10/1950 | Ballou | 70/459 |
| 2,551,564 | 5/1951 | Marien | 70/459 |
| 3,309,743 | 3/1967 | Verri | 24/599.9 X |
| 3,331,109 | 7/1967 | MacMillan et al. | 24/600.2 X |
| 3,638,283 | 2/1972 | Moretti | 24/376 |
| 4,765,154 | 8/1988 | Martin | 63/23 |
| 5,050,414 | 9/1991 | Huang | 70/456 R |
| 5,167,356 | 12/1992 | Williams | 63/23 X |

FOREIGN PATENT DOCUMENTS

| | | | |
|---|---|---|---|
| 43066 | 2/1934 | France | 24/600.2 |
| 1456406 | 9/1966 | France | 70/459 |
| 1488256 | 6/1967 | France | 24/3 K |
| 2321858 | 3/1977 | France | 63/23 |
| 367539 | 1/1939 | Italy | 70/459 |
| 15223 | of 1887 | United Kingdom | 63/18 |
| 2947 | of 1897 | United Kingdom | 63/18 |
| 11467 | of 1897 | United Kingdom | 24/600.2 |
| 1355 | of 1900 | United Kingdom | 63/18 |
| 536149 | 5/1941 | United Kingdom | 70/459 |

*Primary Examiner*—Lloyd A. Gall

[57] ABSTRACT

A keyring holder including a base frame having a ring at the top for hanging, a fixed half-round hook fixedly connected to one end of the base frame, and a movable hook pivoted to an opposite end of the base frame, and wherein the movable half-round hook can be end matched to the fixed half-round hook to hold coins or circular display objects within a circular groove defined within the fixed and movable half-round hooks.

5 Claims, 6 Drawing Sheets

KEYRING HOLDER

BACKGROUND OF THE INVENTION

The present invention relates to a keyring holder which has a ring for hanging a keyring or the like and, which can be opened for holding coins or circular display objects.

When a keyring is used to carry a bunch of keys, a keyring holder may be simultaneously used to hold the keyring and to fasten it to the belt, etc. Regular keyring holders are simply designed for hanging keyrings on the belt or the like and provide no additional functions. Furthermore, regular keyring holders are not easy to operate for hanging or dismounting a keyring.

SUMMARY OF THE INVENTION

The present invention has been accomplished to provide a keyring holder which can be simultaneously used for carrying coins or circular display objects.

According to one aspect of the present invention, the keyring holder comprises a base frame having a ring at the top for hanging, a fixed half-round hook fixedly connected to one end of the base frame, and a movable half-round hook pivoted to an opposite end of the base frame, and wherein the movable half-round hook can be end matched to the fixed half-round hook to hold coins or circular display objects within a circular groove defined within the fixed and movable half-round hooks.

According to another aspect of the present invention, the base frame comprises two opposite lugs to hold the fixed end of the movable half-round hook by means of a pivot pin, a recessed hole, a spring mounted within the recessed hole, and a spring supported steel ball mounted in the recessed hole to retain the movable hook in the closed position end matched with the fixed hook or the opened position disengaged from the fixed hook.

BRIEF DESCRIPTION OF THE DRAWINGS

The present invention will now be described by way of example with reference to the annexed drawings, in which.

DETAILED DESCRIPTION OF THE PREFERRED EMBODIMENTS

Figure 1:
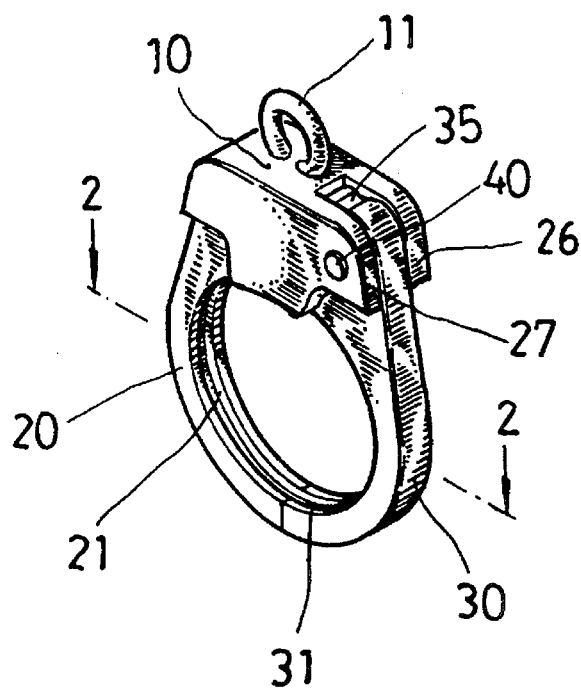
FIG. 1 is an elevational view of a keyring holder according to the present invention.

Referring to FIG. 1, a keyring holder in accordance with the present invention is generally comprised of a base frame 10 having a ring 11 for hanging a keyring or the like, a first half-round hook, namely, the fixed hook 20 fixedly connected to one end of the base frame 10, a second half-round hook, namely, the movable hook 30 pivoted to an opposite end of the base frame 10. When the opposite ends (bottom ends) of the fixed and movable hooks 20 and 30 are end matched, the fixed and movable hooks 20 and 30 form a ring.

Figure 2:
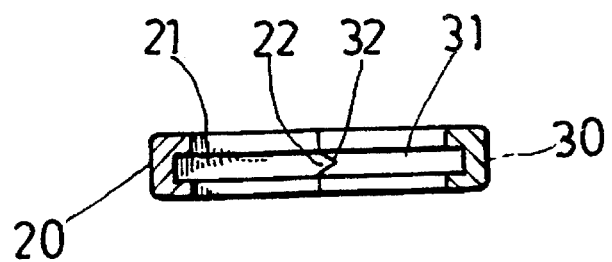
FIG. 2 is a sectional view taken on line 2—2 of FIG. 1.
Figure 3:
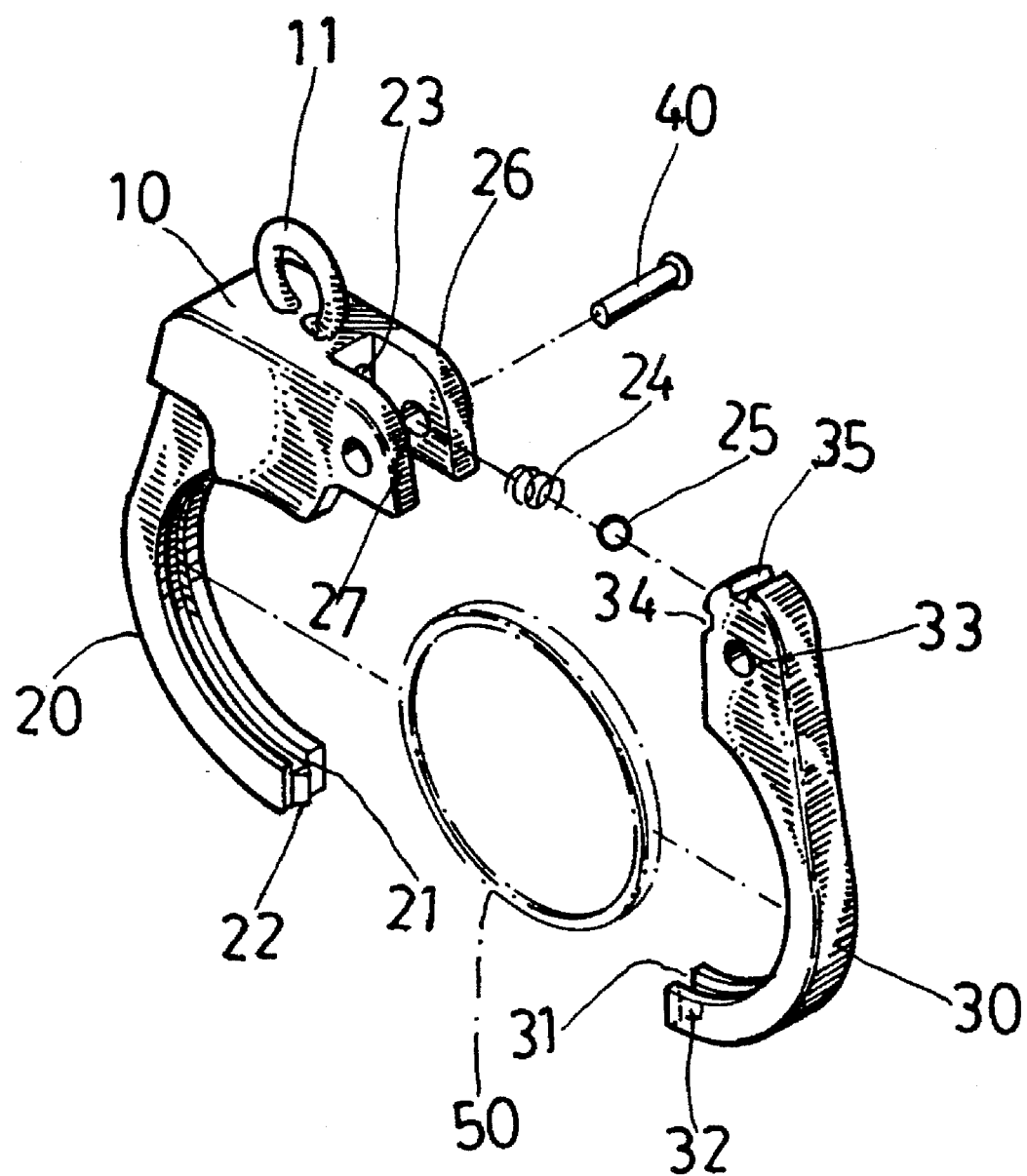
FIG. 3 is an exploded view of the keyring holder shown in FIG. 1.

Referring to FIGS. 2 and 3, the fixed and movable hooks 20 and 30 have a respective groove 21 or 31 at an inner side along the length. A retainer is made on the bottom ends of the hooks 20 and 30 for allowing the hooks 20 and 30 to be end-matched. The retainer can be a wedged mortise 32 made on the bottom end of the movable hook 30 and a wedged tenon 22 made on the bottom end of the fixed hook 20 for fitting into the wedged mortise 32. The base frame 10 comprises two parallel lugs 26 and 27 at one end, a recessed hole 23 horizontally disposed at a suitable location, a spring 24 received within the recessed hole 23, a steel ball 25 supported on the spring 24. The movable hook 30 comprises a pivot hole 33 near the top end and connected between the lugs 26 and 27 by a pivot pin 40, and two transverse locating groove, namely, the first transverse locating groove 34 and the second transverse locating groove 35 spaced around the pivot hole 33 at right angles.

Figure 4:
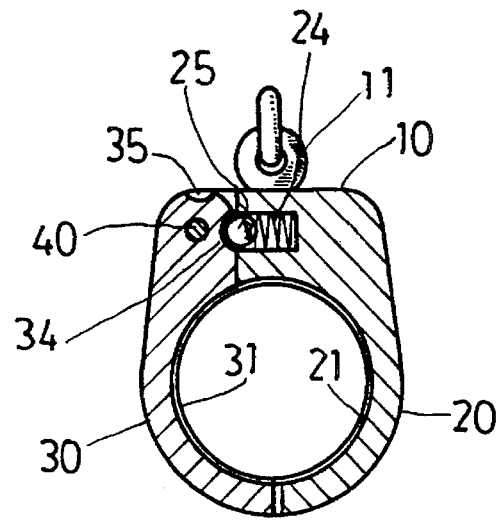
FIG. 4 is a front view in section of FIG. 1.
Figure 5:
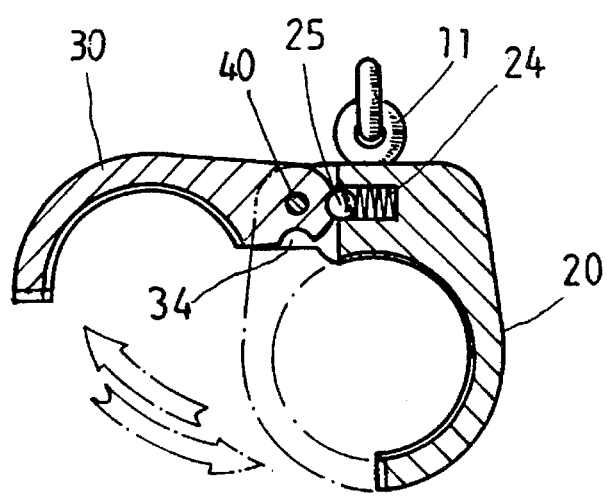
FIG. 5 is similar to FIG. 4 but showing the movable hook opened.

Referring to FIG. 4, when the fixed and movable hooks 20 and 30 are closed (end matched), the steel ball 25 engages the first transverse locating groove 34 causing the fixed and movable hooks 20 and 30 to be firmly retained in the closed status so that a coin 50 (see FIG. 3) can be held in the grooves 21 and 31. When the movable hook 30 is pulled outwards by force, the bottom end of the movable hook 30 is disconnected from the bottom end of the fixed hook 20 (see FIG. 5), and therefore the coin 50 can be taken out of the keyring holder.

Figure 6:
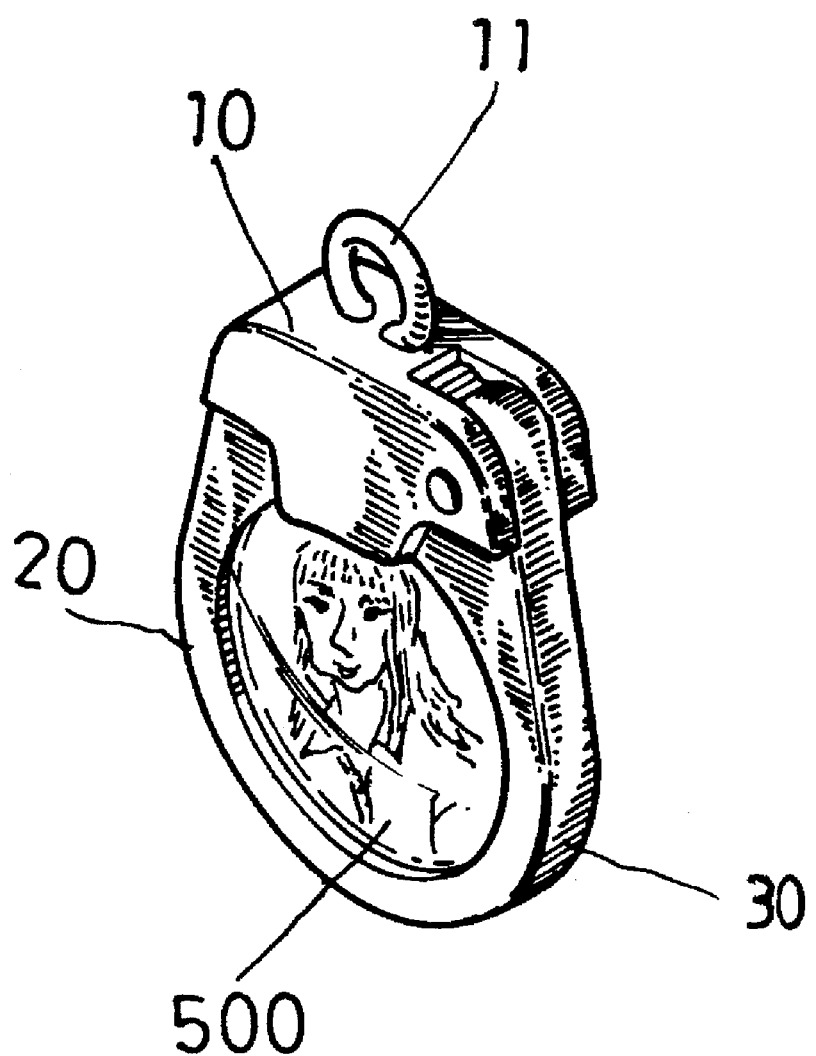
FIG. 6 shows a circular display plate mounted within the keyring holder shown in FIG. 1 to show a picture.

Referring to FIG. 6, a circular display plate 500 may be mounted within the hooks 20 and 30 to show a picture.

Figure 7:
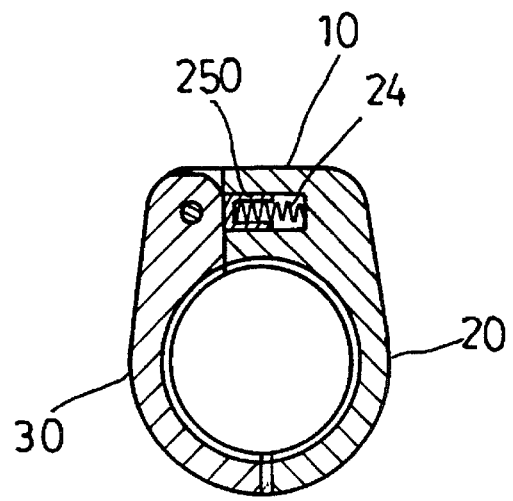
FIG. 7 is a front view in section of an alternate form of the present invention when closed.
Figure 8:
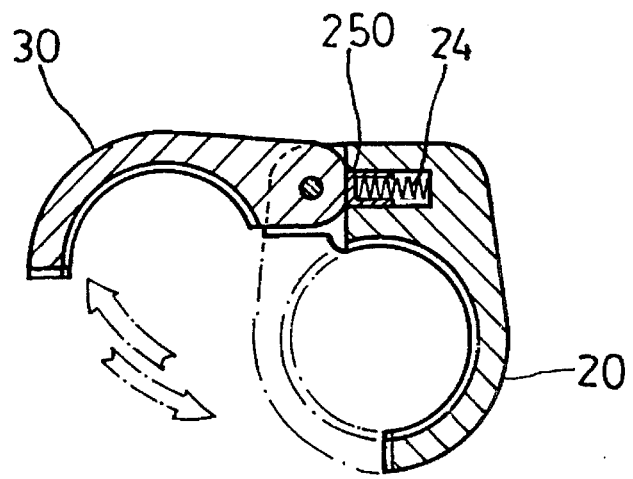
FIG. 8 is similar to FIG. 7 but showing the movable hook opened.

FIGS. 7 and 8 illustrate an alternate form of the present invention, in which a substantially U-shaped locating block 250 is used to replace the aforesaid steel ball 25. This alternate form also eliminates the aforesaid locating grooves 34 and 35.

Figure 10:
FIG. 10 is a side view of the keyring holder shown in FIG. 9.
Figure 9:
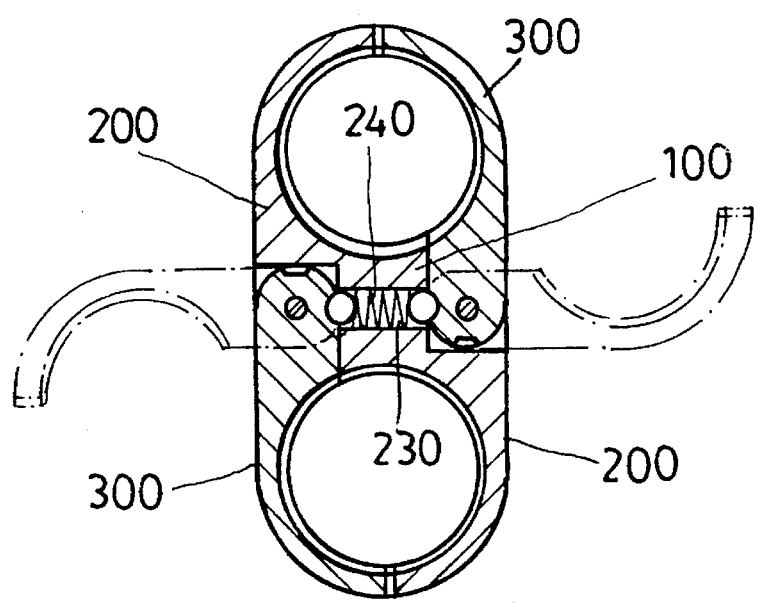
FIG. 9 is a front view in section of another alternate form of the present invention.

FIGS. 9 and 10 illustrate another alternate form of the present invention. This alternate form comprises a base frame 100 having a transverse through hole 230, two opposite fixed hooks 200 and two opposite movable hooks 300 respectively connected to the two opposite ends of the base frame 100 in reversed directions, a locating device 240 received in the transverse through hole 230 to retain the movable hooks 300 in the closed or opened position. The locating device 240 can be a spring having two steel balls at two opposite ends.

While only few embodiments of the present invention have been shown and described, it will be understood that various modifications and changes could be made without departing from the spirit and scope of the invention.

What is claimed is:

1. A keyring holder comprising:
    a base frame having a ring at a top end for hanging;
    a fixed hook fixedly connected to one end of said base frame and having an arched groove at an inner side along the length;
    a movable hook having a fixed end pivoted to an opposite end of said base frame, a free end moved to end-match with said fixed hook, and an arched groove at an inner side along the length; and
    wherein when said fixed hook and said movable hook are end-matched, the arched grooves of said fixed and movable hooks are connected in series to hold coins or circular objects within said base frame and said fixed and movable hooks.

2. The keyring holder of claim 1 wherein said base frame comprises two opposite lugs to hold the fixed end of said movable hook by a pivot pin, a recessed hole, and a spring supported steel ball mounted within said recessed hole to retain said movable hook in position.

3. The keyring holder of claim 1 wherein said base frame comprises two opposite lugs to hold the fixed end of said movable hook by a pivot pin, a recessed hole, a spring mounted within said recessed hole, and a substantially U-shaped block supported on said spring to retain said movable hook in the closed position end-matched with said fixed hook or the opened position disengaged from said fixed hook.

4. The keyring holder of claim 1 further comprising a retainer for holding said fixed and movable hooks end-matched.

5. The keyring holder of claim 4 wherein said retainer comprises a wedged tenon and a wedged mortise respectively made on said fixed and movable hooks for matching with each other.

* * * * *